(12) United States Patent
Parrinello et al.

(10) Patent No.: US 8,632,878 B2
(45) Date of Patent: Jan. 21, 2014

(54) LASER MARKABLE MICROPOROUS MATERIAL

(75) Inventors: Luciano M. Parrinello, Allison Park, PA (US); James L. Boyer, Monroeville, PA (US); Paul L. Benenati, Wadsworth, OH (US)

(73) Assignee: PPG Industries Ohio, Inc., Cleveland, OH (US)

( * ) Notice: Subject to any disclaimer, the term of this patent is extended or adjusted under 35 U.S.C. 154(b) by 208 days.

(21) Appl. No.: 13/023,689

(22) Filed: Feb. 9, 2011

(65) Prior Publication Data

US 2011/0198837 A1    Aug. 18, 2011

Related U.S. Application Data

(60) Provisional application No. 61/303,979, filed on Feb. 12, 2010.

(51) Int. Cl.
*B32B 5/22* (2006.01)
*B32B 5/32* (2006.01)

(52) U.S. Cl.
USPC ......... 428/317.9; 428/319.3; 428/319.7; 428/315.5; 428/316.6; 428/328; 428/331; 283/75

(58) Field of Classification Search
USPC ......... 428/317.9, 319.3, 319.7, 315.5, 316.6, 428/328, 331; 283/75
See application file for complete search history.

(56) References Cited

U.S. PATENT DOCUMENTS

| | | | |
|---|---|---|---|
| 2,940,830 A | 12/1949 | Norton | |
| 2,657,149 A | 10/1953 | Iler | |
| 4,681,750 A | 7/1987 | Johnson et al. | |
| 5,196,262 A | 3/1993 | Schwarz et al. | |
| 5,296,283 A * | 3/1994 | Froggatt | 428/204 |
| 6,010,970 A * | 1/2000 | McGinty et al. | 442/365 |
| 6,114,023 A * | 9/2000 | Schwarz et al. | 428/315.5 |
| 6,919,035 B1* | 7/2005 | Clough | 252/500 |
| 7,033,677 B2* | 4/2006 | Busch et al. | 428/515 |
| 2004/0188996 A1* | 9/2004 | Nitta et al. | 283/72 |
| 2006/0141391 A1* | 6/2006 | Klein et al. | 430/270.1 |
| 2008/0261011 A1* | 10/2008 | Benenati et al. | 428/220 |
| 2009/0246487 A1 | 10/2009 | Boyer et al. | |
| 2009/0311504 A1 | 12/2009 | Boyer et al. | |

FOREIGN PATENT DOCUMENTS

| | | |
|---|---|---|
| WO | 9206577 A2 | 4/1992 |
| WO | 9722467 A1 | 6/1997 |
| WO | 02068192 A1 | 9/2002 |
| WO | 2009123812 A1 | 10/2009 |

* cited by examiner

*Primary Examiner* — Hai Vo
(74) *Attorney, Agent, or Firm* — Deborah M. Ahman

(57) ABSTRACT

Provided is a microporous material including a polyolefin matrix material; finely divided, substantially water-insoluble filler distributed throughout the matrix material, where the filler includes a positive amount of titanium dioxide; a network of interconnecting pores communicating throughout the microporous material; and optionally, a contrasting enhancing amount of a contrast enhancing material. The sum of the weight percent of the titanium dioxide and the weight percent of the optional contrast enhancing material is at least 3 weight percent based on total weight of the microporous material. Multilayer articles having a layer of the microporous material also are provided.

13 Claims, No Drawings

LASER MARKABLE MICROPOROUS MATERIAL

CROSS-REFERENCE TO RELATED APPLICATIONS

This application claims the benefit of priority of U.S. Provisional Patent Application No. 61/303,979, filed Feb. 12, 2010, which is incorporated herein by reference in its entirety.

FIELD OF THE INVENTION

The present invention relates to filled microporous material, e.g., silica-containing microporous sheet material, which is amenable to laser marking, and to multilayer articles comprising such microporous material.

BACKGROUND OF THE INVENTION

Documents, such as identification cards, credit cards, banking cards, driver's licenses, some banknotes, security documents, security cards, etc may be formed from microporous material and multilayer articles comprising such microporous material. Marking of these documents with identification marks, such as date codes, batch codes, bar codes, images, text, functional marks, such as computer keyboard characters, and decorative marks, is common practice to deter forgery and allow counterfeit documents to be readily detected. Laser marking or engraving is a well known means for quickly and cleanly inscribing these identification marks on and within such documents.

Using a laser to provide a document with written or engraved information has a number of advantages over conventional ink printing. For example, using a laser to provide an engraving that has a tactile feel can be a useful authenticator of data that can be difficult to counterfeit or alter. In addition, laser engraving generally does not require the use of ink, which can reduce the cost of consumables used to manufacture such documents. Laser engraving can also be more durable than ink printing and more resistant to abrasion, which can be useful if a counterfeiter attempts to rub off ink-applied information. The resolution and print quality provided by laser engraving typically is better than that of conventional ink-based printing. The laser engraving process also can be a more environmentally friendly marking process than printing with ink because solvents and other chemicals associated with printing inks are not used.

Despite the advantages of using a laser to engrave information on a document and thereby inhibit counterfeiting or altering of the document, some types of materials do not produce adequate contrast and/or resolution of the engraved information when engraved with a laser. Additionally, while some materials, such as polycarbonate, may provide adequate contrast and/or resolution when laser-marked, such materials may not be readily "printable" using a wide range of printing techniques. Therefore, there is a need in the industry for a readily printable material, such as microporous filled polyolefin material, which provides adequate contrast and/or resolution when laser-marked.

BRIEF SUMMARY OF THE INVENTION

The present invention provides a microporous material having improved laser marking capability. The microporous material comprises: (a) a polyolefin matrix material; (b) finely divided, substantially water-insoluble filler distributed throughout the matrix material, the filler comprising a positive amount of titanium dioxide; (c) a network of interconnecting pores communicating throughout the microporous material, the pores constituting 10 to 80 percent by volume of the microporous material; and (d) optionally, a contrasting enhancing amount of a contrast enhancing material. The sum of the weight percent of the titanium dioxide comprising the microporous material and the weight percent of the optional contrast enhancing material comprising the microporous material is at least 3 weight percent based on total weight of the microporous material.

The present invention also is directed to a multilayer article comprising: (a) at least one layer of the microporous material of claim 1 in the form of a sheet; and (b) at least one transparent layer of polymeric material different from the microporous material layer, the transparent layer being affixed to a surface of the microporous sheet.

DETAILED DESCRIPTION OF THE INVENTION

For purposes of this description (other than in the operating examples), unless otherwise indicated, all numbers expressing quantities and ranges of ingredients, process conditions, etc are to be understood as modified in all instances by the term "about". Accordingly, unless indicated to the contrary, the numerical parameters set forth in this description and attached claims are approximations that can vary depending upon the desired results sought to be obtained by the present invention. At the very least, and not as an attempt to limit the application of the doctrine of equivalents to the scope of the claims, each numerical parameter should at least be construed in light of the number of reported significant digits and by applying ordinary rounding techniques. Further, as used in this description and the appended claims, the singular forms "a", "an" and "the" are intended to include plural referents, unless expressly and unequivocally limited to one referent.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurement, including that found in the measuring instrument. Also, it should be understood that any numerical range recited in this description is intended to include all sub-ranges subsumed therein. For example, a range of "1 to 10" is intended to include all sub-ranges between and including the recited minimum value of 1 and the recited maximum value of 10, i.e., a range having a minimum value equal to or greater than 1 and a maximum value of equal to or less than 10. Because the disclosed numerical ranges are continuous, they include every value between the minimum and maximum values. Unless expressly indicated otherwise, the various numerical ranges specified in this description are approximations.

As used in the following description and claims, the following terms have the indicated meanings:

"Document" means any document, such as an identification document or financial transaction device, including but not limited to, national identification (ID) cards, college ID cards, health insurance cards, badges and passes, entitlement cards such as discount cards and membership cards, smart cards, driver's licenses, passports, credit cards, money cards, banking cards, documents for holding permanent and long lasting records, such as medical records, and all types of security cards.

"Indicium" or "indicia" information refers to information engraved or marked on or within a document, e.g., by use of one or more lasers. The indicia information may be visibly perceptible markings suitable for human reading, markings suitable for machine reading, or markings not visible to the human eye, e.g., markings visible only under infra-red, ultraviolet or other non-visible radiation.

"Multilayer article" refers to an article comprising at least two separate layers, plies or sheets of material, one of which, for purposes of the present invention, is a microporous material that is suitable for laser inscription. The term "multilayer article" includes articles comprised of film and sheet materials, which include, but are not limited to, multilayer articles (e.g., laminates) that contain substantially transparent polymers and/or substantially transparent adhesives, or that have substantially transparent polymers and/or substantially transparent adhesives as a part of their structure.

The terms "laser engraving", "laser marking" and "laser inscribing" are used interchangeably herein, and refer to the process of introducing information on or within a document by use of one or more lasers. The laser process incorporates information on or within a substrate, e.g., a film, sheet or multilayer article comprising film(s) or sheet(s), by thermal alteration of the irradiated substrate resulting from the absorption of laser beam energy by the substrate, which alteration produces local changes in the optical properties of the substrate.

The terms "laser markings" or "laser engravings" refer to information incorporated on or within a document by laser engraving, laser marking or laser inscribing.

The term "microporous material" (or terms of like import) refers to a microporous polyolefin, e.g., polyethylene, material or composition.

The term "sheet" includes film and sheet-like materials, e.g., a self-supporting or free-standing substrate that is thin in comparison to its length and breadth.

In one aspect of the present invention, the microporous material is a microporous material comprising a (a) a polyolefin matrix material, e.g., substantially linear ultrahigh molecular weight polyolefin, such as polyethylene; (b) finely divided, substantially water-insoluble filler distributed throughout the matrix material, the filler comprising a positive amount of titanium dioxide; (c) a network of interconnecting pores communicating throughout the microporous material, the pores constituting 10 to 80 percent by volume of the microporous material; and (d) optionally, a contrasting enhancing amount of a contrast enhancing material. It should be noted that titanium dioxide is a known filler for polyolefin microporous materials. However, titanium dioxide generally is used in amounts of less than 3 weight percent (e.g., 2.0-2.5 weight percent) based on total weight of the microporous material. In the microporous materials of the present invention, the sum of the weight percent of the titanium dioxide comprising the microporous material and the weight percent of the optional contrast enhancing material comprising the microporous material is at least 3 weight percent based on total weight of the microporous material.

The polyolefin matrix material comprising the microporous material can comprise a mixture of (1) substantially linear, ultrahigh molecular polyolefin, e.g., polyethylene, and (2) lower molecular weight polyolefin, e.g., high density polyethylene. As discussed in more detail herein below, the finely divided substantially water-insoluble particles can comprise siliceous and/or non-siliceous particles. In a particular embodiment of the present invention, the polyolefin matrix material comprises a mixture of (a) 1 to 99 weight percent of substantially linear, ultrahigh molecular weight polyethylene; and (b) 99 to 1 weight percent of high density polyethylene, based on total weight of the polyolefin matrix material present in the microporous material.

As previously mentioned, the microporous material contains a contrast-enhancing amount of contrast enhancing material. A contrast enhancing amount of such material is an amount that is sufficient to improve the contrast, e.g., readability, of the composition when engraved with a laser, vis-à-vis, when compared to the same microporous material that does not contain a contrast-enhancing amount of contrast enhancing material. The foregoing amount of contrast enhancing material can be referred to as an "effective amount", i.e., an amount that is sufficient and effective to improve the contrast and/or resolution (also referred to as readability), of a laser engraved microporous material when in the form of a film, sheet or multilayer article comprising such film or sheet.

It should be mentioned that levels of titanium dioxide higher than 3 weight percent have been observed to enhance laser-markability of a microporous material in which the titanium dioxide has been incorporated, even in the absence of a contrast enhancing material (as defined herein). Levels of titanium dioxide greater than 3 weight percent suitable for this purpose can vary widely provided other physical properties of the microporous material are not adversely affected. Suitable levels of titanium dioxide are discussed herein below. Particulate titanium dioxide is a well known commercially available white pigment. Generally, the titanium dioxide used is rutile titanium dioxide. Pigmentary titanium dioxide is available from many suppliers such as E.I. DuPont de Nemours & Co., Inc. (Ti-pure® titanium dioxide); NL Chemicals (Titanox® titanium dioxide); Kerr McGee Chemical Corp. (Tronox® titanium dioxide) and Tioxide S.A. (Tioxide® titanium dioxide).

The effective amount of contrast enhancing material (different from titanium dioxide) used to improve the contrast (or laser markability) of a microporous sheet material can vary, and will depend on the particular microporous material composition and/or type of article to be formed from said microporous material, as well as the contrast enhancing material itself. Generally, an effective amount of contrast enhancing material will be at least approximately 3 weight percent, e.g., from 3 to 20 weight percent of the microporous material, or from 3 to 15 weight percent, or from 4 to 10, or from 4.5 to 7.5 weight percent. An effective amount of contrast enhancing material also can be expressed as a percent of the volume of the microporous composition or film or sheet material that comprises the microporous material. Typically, the contrast enhancing material represents at least 0.4 volume percent of the microporous silica-containing sheet material, e.g., from 0.45 to 3.0 volume percent, or from 0.45 to 2.0 volume percent. Higher amounts of contrast enhancing material may be used if desired.

As previously mentioned, the sum of the weight percent of titanium dioxide present in the microporous material and the weight percent of the contrasting enhancing material present in the microporous material is greater than 3 weight percent, such as greater than 5 weight percent or greater than 7 weight percent, based on total weight of the microporous material. In a particular embodiment, the contrast enhancing material is not present, and the titanium dioxide is present in an amount ranging from 3 to 20 weight percent based on total weight of the microporous material. Typically, the titanium dioxide is present in an amount ranging from 5 to 15 weight percent, and the contrast enhancing material is present in an amount ranging from 0.01 to 10 weight percent, based on total weight of the microporous material.

Contrast enhancing materials (different from titanium dioxide) suitable for use in the laser engravable microporous materials of the present invention typically are in particulate form. Suitable contrast enhancing materials can comprise, but are not limited to metal oxides including antimony (III) oxide and tungsten oxide (e.g., reduced tungsten oxide such as $WO_n$, where n ranges from 2 to less than 3); pearl luster pigments, such as, tin oxide coated mica or any number of mica, metal oxide or other oxides coated with antimony tin oxide, titanium dioxide plus other metal oxides; kaoline, chalks, aluminas, phyllosilicates, mica, carbon, carbon black, nano-particle carbon, nano-fiber carbon, metallic pigments, aluminum, copper potassium iodide, copper iodide, zinc sulfide, barium sulfide, benzotriazoles, alkyl sulfonates, thioesters. The contrast enhancing materials suitable for use in the present invention typically are in the form of compositions which contain the aforementioned contrast enhancing materials in addition to a carrier (e.g., a solvent, resin or dispersant) for these materials. In a particular embodiment of the present invention, the contrast enhancing materials comprise antimony oxide, reduced tungsten oxide, tin antimony oxide, tin antimony gray Cassiterite, and mixtures thereof.

The essentially linear UHMW polyolefin is essentially linear UHMW polyethylene (UHMWPE) having an intrinsic viscosity of at least 10 deciliters/gram, essentially linear UHMW polypropylene (UHMWPP) having an intrinsic viscosity of at least 6 deciliters/gram, or mixtures of such UHMW polyolefins. As noted, the intrinsic viscosity of the UHMWPE is at least 10 deciliters/gram, e.g., at least 14 deciliters/gram. Often the intrinsic viscosity is at least 18 deciliters/gram, and in many cases is at least 19 deciliters/gram. Although there is no particular restriction on the upper limit of the intrinsic viscosity, the intrinsic viscosity is frequently in the range of from 10 to 39 deciliters/gram, e.g., from 14 to 39 deciliters/gram. In some cases the intrinsic viscosity is in the range of from 18 to 39 deciliters/gram, e.g., in the range of from 18 to about 32 deciliters/gram.

As noted, the intrinsic viscosity of UHMW polypropylene is at least 6 deciliters/gram. In some cases, the intrinsic viscosity is at least 7 deciliters/gram. Although there is no particular restriction on the upper limit of the UHMW polypropylene intrinsic viscosity, it is generally in the range of from 6 to 18 deciliters/gram, e.g., from 7 to 16 deciliters/gram. Essentially linear UHMW polypropylene is generally isotactic polypropylene. The degree of isotacicity of such polymer is at least 95 percent, e.g., at least 98 percent The intrinsic viscosity of UHMWPE is determined by extrapolating to zero concentration the reduced viscosities or the inherent viscosities of several dilute solutions of the UHMWPE, wherein the solvent is freshly distilled decahydronaphthalene to which 0.2 percent by weight 3,5-di-tert-butyl-4-hydroxyhydrocinnamic acid, neopentanetetrayl ester [CAS Registry No. 6683-19-8] has been added. The reduced viscosities or the inherent viscosities of the UHMWPE are ascertained from relative viscosities obtained at 135° C. using an Ubbelohde No. 1 viscometer in accordance with the general procedures of ASTM D 4020-81, except that several dilute solutions of differing concentration are employed. ASTM D 4020-81 is incorporated herein in its entirety by reference.

The nominal molecular weight of UHMW polyethylene is empirically related to the intrinsic viscosity of the polymer in accordance with the following equation:

$$M = 5.37 \times 10^4 [\acute{\eta}]^{1.37}$$

wherein M is the nominal molecular weight and $[\acute{\eta}]$ is the intrinsic viscosity of the UHMW polyethylene expressed in deciliters/gram. Similarly, the nominal molecular weight of UHMW polypropylene is empirically related to the intrinsic viscosity of the polymer according to the following equation:

$$M = 8.88 \times 10^4 [\acute{\eta}]^{1.25}$$

wherein M is the nominal molecular weight and $[\acute{\eta}]$ is the intrinsic viscosity of the UHMW polypropylene expressed in deciliters/gram.

in the embodiment wherein the polyolefin comprising the microporous material is a mixture of (1) substantially linear, ultrahigh molecular polyolefin, e.g., polyethylene, and lower molecular weight polyethylene, the lower molecular weight polyethylene can have an ASTM D 1238-86 Condition E melt index of less than approximately 50 grams/10 minutes and an ASTM D 1238-86 Condition F melt index of at least 0.1 gram/10 minutes.

The lower molecular weight polyethylene (LMWPE) is thermoplastic and many different types are known. One method of classifying the LMWPE products is by their density. In accordance with ASTM D 1248-84 (Reapproved 1989), the density of low density polyethylene (LDPE) ranges from 0.910-0.925 grams/cubic centimeters; the density of medium density polyethylene (MDPE) ranges from 0.926-0.940 grams/cubic centimeter; and the density of high density polyethylene (HDPE) ranges from 0.941-0.965 grams/cubic centimeter. Any or all of these polyethylenes may be used as the LMWPE in the mixture with UHMWPE. Generally, HDPE is used because it ordinarily tends to be more linear than MDPE or LDPE. ASTM D 1248-84 (Reapproved 1989) is incorporated herein in its entirety by reference.

As noted, the ASTM D 1238-86 Condition E (that is, 190° C. and 2.16 kilogram load) melt index of the LMWPE is less than 50 grams/10 minutes. Often the Condition E melt index is less than 25 grams/10 minutes, e.g., less than 15 grams/10 minutes. The ASTM D 1238-86 Condition F (that is, 190 degrees. C. and 21.6 kilogram load) melt index of the LMWPE is at least 0.1 gram/10 minutes. Generally, the Condition F melt index is at least 0.5 gram/10 minutes, e.g., at least 1.0 gram/10 minutes. ASTM D 1238-86 is incorporated herein in its entirety by reference.

One or more other thermoplastic organic polymers also can be present in the microporous polyolefin material so long as their presence does not affect materially the properties of the microporous material in an adverse manner. The amount of other thermoplastic polymer(s) that may be present in the microporous silica-containing material depends upon the physical properties of such other thermoplastic polymer(s). Examples of thermoplastic organic polymers which may optionally be present include, but are not limited to, poly (tetrafluoroethylene), polypropylene, polycarbonates, polyesters such as amorphous polyethylene terephthalate (PET), glycol-modified polyethylene terephthalate (PETG), polyamides, polyurethanes, copolymers of ethylene and propylene, copolymers of ethylene and acrylic acid, and copolymers of ethylene and methacrylic acid. If desired, all or a portion of the carboxyl groups of carboxyl-containing copolymers may be neutralized with sodium, zinc, and the like.

In a particular embodiment of the present invention, the contrasting enhancing material can contain any of the aforementioned thermoplastic organic polymers in the form of a particulate coated with one or more of the contrast enhancing materials discussed above. For example, the contrast enhancing material can comprise particulate polyamide coated with antimony oxide.

In most cases, the UHMWPE and the LMWPE together constitute at least 65 percent by weight of the polymer, e.g., polyolefin, present in the microporous silica-containing material (MSCM). Often the UHMWPE and the LMWPE together constitute at least 85 percent by weight of the polymer of the MSCM. In a particular embodiment of the present invention, the UHMWPE and the LMWPE together constitute substantially 100 percent by weight of the polyolefin polymer of the microporous material.

The LMWPE, e.g., HDPE, can comprise from 30 to 80 weight percent of the MSCM, such as from 40 to 80 weight percent, e.g., from 50 to 80 weight percent. By "high density" polyolefin, e.g., HDPE, is meant a polyolefin having a density greater than 0.940 g/cm$^3$, such as from 0.941 to 0.965 g/cm$^3$. Such high density polyolefins are known in the art and are commercially available. Examples of such materials include, but are not limited to, FINA 1288, which is available from Total Petrochemicals (manufactured by Atofina), and MG-0240, which is available from Braskem.

The finely divided substantially water-insoluble filler can include both siliceous and non-siliceous materials in the form of particles. The finely divided substantially water-insoluble particles may be in the form of ultimate particles, aggregates of ultimate particles, or a combination of both.

Typically, with respect to siliceous particles, at least 90 percent by weight of the siliceous particles used in preparing the microporous material have average gross particle sizes in the range of from 1 to 300 micrometers, such as from 3 to 100, or from 5 to 50 micrometers, as determined by use of a Model TAII Coulter counter (Coulter Electronics, Inc.) according to ASTM C 690-80 but modified by stirring the filler for 10 minutes in Isoton II electrolyte (Curtin Matheson Scientific, Inc.) using a four-blade, 4.445 centimeter diameter propeller stirrer. Advantageously, at least 90 percent by weight of the particles have average gross particle sizes in the range of from 10 to 30 micrometers. It is expected that the sizes of filler agglomerates may be reduced during processing of the ingredients to prepare the microporous material. Accordingly, the distribution of gross particle sizes in the microporous material may be smaller than in the raw siliceous filler itself. ASTM C 690-80 is incorporated herein in its entirety by reference.

The finely divided substantially water-insoluble, non-siliceous filler particles may be in the form of ultimate particles, aggregates of ultimate particles or a combination of both. In most cases, at least 75 percent by weight of the non-siliceous filler particles used in preparing the microporous silica-containing polyolefin material have average gross particle sizes in the range of from 0.1 to 40 micrometers, as determined by use of a Micromeretics Sedigraph 5000-D (Micromeretics Instrument Corp.) in accordance with the accompanying operating manual. The gross particle size will vary from filler to filler. It is expected that the size of the non-siliceous filler may be reduced during processing of the ingredients to prepare the microporous material. Therefore, the distribution of gross particle sizes in the microporous material may be smaller than in the raw non-siliceous filler itself.

Suitable examples of siliceous particles can include but are not limited to particles of silica, mica, montmorillonite, kaolinite, talc, diatomaceous earth, vermiculite, natural and synthetic zeolites, calcium silicate, aluminum silicate, sodium aluminum silicate, aluminum polysilicate, alumina silica gels and glass particles. Usually, silica and the clays are used as the siliceous particles. Of the silicas, precipitated silica, silica gel or fumed silica is most often used. Typically, the finely divided substantially water-insoluble siliceous filler that is used is precipitated silica.

Different precipitated silicas may be employed to prepare the microporous silica-containing polyolefin material of the present invention, but generally the precipitated silica used is obtained by precipitation from an aqueous solution of sodium silicate that is neutralized using a suitable acid, such as sulfuric acid, hydrochloric acid or carbon dioxide. Such precipitated silicas are well known and processes for producing them are described in detail in U.S. Pat. Nos. 2,657,149, 2,940,830, and 4,681,750. Particulate precipitated silica is available commercially from many sources. For example, Hi-Sil® precipitated silicas in various grades are available from PPG Industries, Inc.

Typically, the average ultimate particle size (irrespective of whether or not the ultimate particles are agglomerated) of precipitated silica is less than 0.1 micrometers, as determined by transmission electron microscopy. Often the average ultimate particle size is less than 0.05 micrometers, e.g., less than 0.03 micrometers. Precipitated silica typically has a BET surface area (5 Point) ranging from 20 to 400 m$^2$/gram, such as from 50 to 250 m$^2$/gram, more typically from 100 to 200 m$^2$/gram, e.g., from 140 to 180 m$^2$/gram. The oil absorption of precipitated silica can range from 1 to 500 ml/100 grams, e.g., from 50 to 400 ml/100 grams. More particularly, the oil absorption can range from 100 to 350 ml/100 grams, such as from 150 to 320 ml/100 grams, e.g., from 190 to 205 ml/100 grams. The oil absorption can vary between any of the aforesaid lower values for a given range and any of the upper values for a given range.

Examples of suitable non-siliceous materials (i.e., other than titanium dioxide) can include, but are not limited to iron oxide, copper oxide, zinc oxide, antimony oxide, zirconia, magnesium oxide, alumina, molybdenum disulfide, zinc sulfide, barium sulfate, strontium sulfate, calcium carbonate, magnesium carbonate, magnesium hydroxide, as well as finely divided substantially water-insoluble flame retardant filler particles such as particles of ethylenebis(tetra-bromophthalimide), octabromodiphenyl oxide, decabromodiphenyl oxide, and ethylenebisdibromonorbornane dicarboximide.

In a particular embodiment of the present invention, at least 50 percent by weight of the finely-divided substantially water-insoluble filler particles in the microporous material are finely-divided substantially water-insoluble siliceous filler particles. In many cases at least 65 percent by weight of the finely-divided substantially water-insoluble filler particles are siliceous filler particles. Often at least 75 percent by weight of the finely divided substantially water-insoluble filler particles are siliceous, e.g., at least 85 percent by weight of the finely divided substantially water-insoluble filler particles are siliceous. In many instances, all of the finely divided substantially water-insoluble filler particles are siliceous.

Other materials can be included where desired in the production of the microporous substrate (e.g., a substrate in the form of a film or sheet), such as lubricants, processing plasticizer, organic extraction liquid, surfactant, water and the like, may be present in the finished microporous sheet substrate. Other materials that are introduced for particular purposes optionally may be present in the microporous material. Examples of such materials can include, but are not limited to, antioxidants, ultraviolet light absorbers, visible light and infrared wave energy sensitive materials, reinforcing fibers such as chopped glass fiber strand, dyes, other pigments, mixtures of dyes and pigments, and the like.

Also, in addition to or in lieu of the contrast enhancing materials described previously, other laser energy absorbing additives (laser enhancing additives) may optionally be present. Non-limiting examples of such laser enhancing additives can include but are not limited to carbon, nano-particle carbon, nano-fiber carbon, copper potassium iodide, copper iodide, zinc sulfide, barium sulfide, alkyl sulfonate, and thioester. Such other laser enhancing materials can be present in amounts ranging from 0.001 to 15 percent by weight, such as from 0.1 to 15 percent by weight. The balance of the microporous material (exclusive of filler and any coating, printing ink, or impregnant applied for one or more special purposes) is essentially the thermoplastic organic polyolefin polymer.

On a coating-free, printing ink free, impregnant-free and pre-bonding basis, pores constitute at least approximately 10 percent by volume of the microporous matrix. In many instances the pores constitute at least 20 percent by volume of the microporous material, e.g., approximately 80 volume percent. Typically, the pores constitute from at least 10 percent to 80 percent by volume of the microporous material, e.g., from 60 to 75 volume percent. As used herein and in the claims, the porosity (also known as void volume) of the microporous matrix, expressed as percent by volume, is determined according to the equation:

$$\text{Porosity} = 100[1 - d_1/d_2]$$

wherein $d_1$ is the density of the sample, as determined from the sample weight and the sample volume, as ascertained from measurements of the sample dimensions, and $d_2$ is the density of the solid portion of the sample, which is determined from the sample weight and the volume of the solid portion of the sample. The volume of the solid portion can be determined using a Quantachrome stereopycnometer (Quantachrome Corp.) in accordance with the accompanying operating manual.

The volume average diameter of the pores of the microporous material can be determined by mercury porosimetry using an Autoscan mercury porosimeter (Quantachrome Corp.) in accordance with the accompanying operating manual. The volume average pore radius for a single scan is automatically determined by the porosimeter. In operating the porosimeter, a scan is made in the high pressure range (from 138 kilopascals absolute to 227 megapascals absolute). If 2 percent or less of the total intruded volume occurs at the low end (from 138 to 250 kilopascals absolute) of the high pressure range, the volume average pore diameter is taken as twice the volume average pore radius determined by the porosimeter. Otherwise, an additional scan is made in the low pressure range (from 7 to 165 kilopascals absolute) and the volume average pore diameter is calculated according to the equation:

$$d = 2(v_1 r_1/w_1 + v_2 r_2/w_2)/(v_1/w_1 + v_2/w_2)$$

wherein d is the volume average pore diameter, $v_1$ is the total volume of mercury intruded in the high pressure range, $v_2$ is the total volume of mercury intruded in the low pressure range, $r_1$ is the volume average pore radius determined from the high pressure scan, $r_2$ is the volume average pore radius determined from the low pressure scan, $w_1$ is the weight of the sample subjected to the high pressure scan, and $w_2$ is the weight of the sample subjected to the low pressure scan.

Generally on a coating-free, printing ink-free, impregnant-free, and pre-bonding basis the volume average diameter of the pores is in the range of from 0.02 to 0.5 micrometer. Very often the volume average diameter of the pores is in the range of from 0.04 to 0.3 micrometer, e.g., from 0.05 to 0.25 micrometer. In the course of determining the volume average pore diameter by the above procedure, the maximum pore radius detected is sometimes noted. This is taken from the low pressure range scan if run; otherwise, it is taken from the high pressure range scan. The maximum pore diameter is twice the maximum pore radius. The parameters in respect of porosity, volume average diameter of the pores and maximum pore diameter are determined for the microporous matrix prior to any coating, printing, impregnation or bonding processes applied to the matrix.

The microporous polyolefin substrate can be produced in accordance with the general principles and procedures described in U.S. Pat. No. 5,196,262. Generally, the filler particles, contrast enhancing materials (if desired), the other laser enhancing materials (when employed), thermoplastic organic polymer powders, processing plasticizer and desired amounts lubricant and antioxidant are mixed until a substantially uniform mixture is obtained. The weight ratio of filler to polymer powder employed in forming the mixture is essentially the same as that of the microporous substrate to be produced. The mixture, together with additional processing plasticizer, is introduced to the heated barrel of a screw extruder. Typically, a sheeting die is attached to the end of the extruder.

A continuous sheet formed by the sheeting die is forwarded without drawing to a pair of heated calender rolls acting cooperatively to form a continuous sheet of lesser thickness than the continuous sheet exiting from the sheeting die. The continuous sheet from the calender then passes to a first extraction zone where the processing plasticizer is substantially removed by extraction with an organic liquid that is a good solvent for the processing plasticizer, a poor solvent for the organic polymer, and more volatile than the processing plasticizer. Usually, but not necessarily, both the processing plasticizer and the organic extraction liquid are substantially immiscible with water. The continuous sheet then passes to a second extraction zone where the residual organic extraction liquid is substantially removed by steam and/or water. The continuous sheet is then passed through a forced air dryer for substantial removal of residual water and remaining residual organic extraction liquid. From the dryer the continuous sheet, which is the microporous substrate, is passed to a take-up roll.

If desired the sheet material can be unwound from the take-up roll and biaxially stretched by first uniaxially stretching in the machine direction, for example, using a single stage roll-to-roll machine direction stretching (MDS) unit and then essentially uniaxially stretching in the transverse direction using a moving clip tenter frame as a transverse direction stretching (TDS) unit. A preheat roll is typically employed with the MDS unit to heat the sheet prior to stretching. In the TDS unit, the sheet can be heated by infrared radiant heaters.

The processing plasticizer has little solvating effect on the thermoplastic organic polymer at 60° C., only a moderate solvating effect at elevated temperatures on the order of 100° C., and a significant solvating effect at elevated temperatures on the order of 200° C. It is a liquid at room temperature and usually it is a processing oil, such as paraffinic oil, naphthenic oil, or aromatic oil. Suitable processing oils include those meeting the requirements of ASTM D 2226-82, Types 103 and 104. Typically used are oils that have a pour point of less than 22° C., according to ASTM D 97-66 (reapproved 1978), e.g., a pour point of less than 10° C. Examples of suitable oils include Shellflex RTM 412 and Shellflex RTM 371 oil (Shell Oil Co.), which are solvent refined and hydrotreated oils derived from naphthenic crude. Further examples of suitable oils include ARCOprime.RTM 400 oil (Atlantic Richfield Co.) and Kaydol.RTM oil (Witco Corp.), which are white mineral oils. ASTM D 2226-82 and ASTM D 97-66 (reapproved 1978) are both incorporated herein in their entirety by reference. It is expected that other materials, including the phthalate ester plasticizers, such as dibutyl phthalate, bis(2-ethylhexyl) phthalate, diisodecyl phthalate, dicyclohexyl phthalate, butyl benzyl phthalate, and ditridecyl phthalate, will function satisfactorily as processing plasticizers. There are many organic extraction liquids that can be used in the process. Examples of suitable organic extraction liquids include, but are not limited to, 1,1,2-trichloroethylene; perchloroethylene; 1,2-dichloroethane; 1,1,1-trichloroethane; 1,1,2-trichloroethane; methylene chloride; chloroform; 1,1,2-trichloro-1,2,2-trifluoroethane; isopropyl alcohol; diethyl ether; acetone; hexane; heptane and toluene. One or more azeotropes of halogenated hydrocarbons selected from trans-1,2-dichloroethylene, 1,1,1,2,2,3,4,5,5,5-decafluoropentane, and/or 1,1,1,3,3-pentafluorobutane also can be employed. Such materials are available commercially as VERTREL™ MCA (a binary azeotrope of 1,1,1,2,2,3,4,5,5,5-dihydrodecafluoropentane and trans-1,2-dichloroethylene: 62%/38%) and VERTREL™ CCA (a ternary azeotrope of 1,1,1,2,2,3,4,5,5,5-dihydrodecafluorpentane, 1,1,1,3,3-pentafluorbutane, and trans-1,2-dichloroethylene: 33%/28%/39%); Vertrel™ SDG (80-83% trans-1,2-dichloroethylene, 17-20% hydrofluorocarbon mixture) all available from MicroCare Corporation.

In the above described process for producing microporous polyolefin material, extrusion and calendering are facilitated when the substantially water-insoluble filler particles carry much of the processing plasticizer. The capacity of the filler particles to absorb and hold the processing plasticizer is a function of the surface area of the filler. Consequently, the filler(s) typically has a high surface area. High surface area fillers are materials of very small particle size, high porosity or materials exhibiting both of these physical characteristics. Usually the surface area of at least the siliceous filler particles is in the range of from about 20 to about 400 square meters per gram, as determined by the Brunauer, Emmett, Teller (BET) method according to ASTM C 819-77 using nitrogen as the adsorbate but modified by outgassing the system and the sample for one hour at 130° C.

Inasmuch as it is desirable to essentially retain the filler in the microporous material, the substantially water-insoluble filler particles will generally be substantially insoluble in the processing plasticizer and substantially insoluble in the organic extraction liquid when microporous material is produced by the above process.

The residual processing plasticizer content of the microporous polyolefin material can be less than 10 percent by weight of the microporous sheet, and this level may be reduced even further by additional extractions using the same or a different organic extraction liquid. For some applications, the residual processing plasticizer content may be higher, for example from 10 to 20 percent by weight of the microporous sheet. Often the residual processing plasticizer content is less than 5 percent by weight of the microporous sheet, and this level may be reduced even further by additional extractions. The microporous polyolefin sheet material produced in the manner described above typically has a density ranging from 0.5 to 0.9 g/cc, e.g., from 0.6 to 0.9 g/cc, and an air flow rate of at least 300 Gurley seconds, for example, at least 500 Gurley seconds, or at least 1000 Gurley seconds, e.g., at least 1100 Gurley seconds, such as from 1200 to 1800 Gurley seconds, e.g., from 1300 to 4000 Gurley seconds.

Microporous polyolefin sheet materials of the type described above, but without the contrast-enhancing amount of contrast enhancing material, are available from PPG Industries, Inc. Such materials are sold under the TESLIN® trademark. Examples of such materials are TESLIN SP700 substrate and TESLIN 1100 HD substrate.

It should be noted that the contrast enhancing material, such as any of those previously described above, may be included as an ingredient in the polyolefin mixture used to form the microporous material, as previously mentioned, and/or the contrast enhancing material may be included as a component in a coating applied to a surface of the microporous material in the form of a film or sheet.

The microporous polyolefin material, e.g., sheet, may be used by itself or in a multilayer article. The multilayer article can comprise 2 or more layers of different plastic compositions. For example, the microporous polyolefin sheet material can be used as the core material of a multilayer article and covered i.e., laminated to or with) one or two sheets of a transparent polymer, e.g., polyvinyl chloride (PVC), polycarbonate or polyester, on one or both exposed sides (top and bottom). The microporous polyolefin sheet material can be printed with information, e.g., by offset and/or screen printing using printing ink, before being incorporated into the multilayer article, and before being laser engraved. As noted, the multilayer article can comprise a plurality of layers, which can include adhesives to bond one or more of the layers together, and a plurality of various polymer films. The thickness of the final multilayer article is not critical and will depend on the requirements of use of the final article. In many cases, each of the multilayer article layers can vary in thickness, e.g., from 1 to 20 mils. Lamination of the individual multilayer article layers can be accomplished using any conventional lamination process that is known to those skilled in the production of documents, such as identification documents.

Laser marking is a well known and important means for quickly and cleanly inscribing plastic surfaces, e.g., documents, having a laser reactive plastic surface (either on an internal [subsurface] or on an external surface of the document) with identification marks or images, such as date codes, batch codes, bar codes, part numbers, functional marks, such as computer keyboard characters, graphic and decorative marks, such as photographic images and company logos. Such marking is often referred to as personalizing the document. Any suitable laser may be used to mark the above-described microporous silica-containing material or an article incorporating the microporous silica-containing material. The type of laser used will depend on the type of marks to be inscribed and the composition of the surface that is to be inscribed.

Generally, the laser used will be a pulsed laser that has readily adjustable variable parameters that govern laser energy characteristics, such as pulse content, pulse duration and pulse frequency, and DPI (dots/inch) settings. Typically, the laser will have a wavelength in the near infrared (780 nm to 2000 nm), the visible range (380 nm to 780 nm) or the near ultraviolet range (150 nm to 380 nm). Such lasers include, but are not limited to, solid state pulsed lasers, pulsed metal vapor lasers, excimer lasers and continuous wave lasers with pulse modification, such as the commercially available Nd:YAG laser [Neodymium-doped Yittrium Aluminum Garnet] (wavelength 1064 nm); frequency-doubled Nd:YAG laser (wavelength 532 nm); frequency tripled Nd/$YVO_4$ laser, and excimer laser (wavelength 193 nm-351 nm). The laser scanning velocity may range from approximately 150 to 350 nm/second and the pulse frequency from approximately 0.1 Hz to 30 kHz, e.g., 1 to 15 kHz for the Nd:YAG laser and 0.1 to 200 Hz for the excimer laser. The amperage ranges are usually from 1 to 20 amperes for the Nd:YAG laser.

Laser marking processes are well known to those skilled in the art. For example, using a commercially available Nd:YAG laser associated with a document transport system and suitable computer system with appropriate software, the document is transported beneath a laser and the laser reactive layer portion of the document is engraved (written or marked) by the laser. By varying the laser power, special effects, such as tactile features, can be created by the laser. After writing on one side, the document can be turned over to the opposite side to mark the other side. Multiple lasers of varying energy characteristics can be used to increase production or create other special effects. After inscribing the desired information on the document, it can be forwarded to the end user.

30 seconds. The mixer was shut off and the internal sides of the mixer were scrapped down to insure all ingredients were evenly mixed. The mixer was turned back on with both high intensity chopper and plough blades turned on, and the mix was mixed for an additional 30 seconds. The mixer was turned off and the mix dumped into a storage container.

TABLE 1

| Ingredients | Ex. 1 | Ex. 2 | Ex. 3 | CE-1 | CE-2 | Ex. 4 | CE-3 | CE-4 |
|---|---|---|---|---|---|---|---|---|
| Silica$^{(a)}$, grams | 2270 | 2270 | 2270 | 2270 | 2270 | 2270 | 2270 | 2270 |
| CaCO$_3$$^{(b)}$, grams | 0 | 0 | 0 | 0 | 0 | 887 | 887 | 0 |
| TiO$_2$$^{(c)}$, grams | 273 | 182 | 137 | 91 | 45 | 148 | 75 | 0 |
| UHMWPE$^{(d)}$, grams | 631 | 631 | 631 | 631 | 631 | 839 | 839 | 631 |
| HDPE$^{(e)}$, grams | 631 | 631 | 631 | 631 | 631 | 774 | 774 | 631 |
| Antioxidant$^{(f)}$, grams | 16 | 16 | 16 | 16 | 16 | 16 | 16 | 16 |
| Lubricant$^{(g)}$, grams | 22.7 | 22.7 | 22.7 | 22.7 | 22.7 | 24 | 24 | 22.7 |
| Process oil$^{(h)}$, grams | 3815 | 3815 | 3815 | 3815 | 3815 | 4550 | 4550 | 3815 |

$^{(a)}$Silica Hi-Sil ® SBG precipitated silica was used and was obtained commercially from PPG Industries, Inc. This silica is reported to have a surface area (BET-5 point) of from 140 to 180 square meters/gram, an oil absorption value of from 190 to 205 ml/100 grams, and an average/mean particle size of from 10 to 20 microns.
$^{(b)}$Camel-Wite ® calcium carbonate was used and was obtained commercially from IMERYS.
$^{(c)}$TIPURE ® R-103 titanium dioxide, obtained commercially form E. I. du Pont de Nemours and Company.
$^{(d)}$GUR ®4130 Ultra High Molecular Weight Polyethylene (UHMWPE), obtained commercially from Ticona Corp and reported to have a molecular weight of about 6.8 million grams per mole.
$^{(e)}$FINA ® 1288 High Density Polyethylene (HDPE), obtained commercially from Total Petrochemicals.
$^{(f)}$CYANOX ® 1790 antioxidant, Cytec Industries, Inc.
$^{(g)}$Calcium stearate lubricant, technical grade.
$^{(h)}$TUFFLO ® 6056 process oil, obtained commercially from PPC Lubricants.

The present invention is further described in conjunction with the following examples, which are to be considered illustrative rather than limiting, and in which all parts are parts by weight and all percentages are percentages by weight unless otherwise specified.

EXAMPLES

Part I describes the preparation and testing of the microporous sheet materials of Examples 1-4 and Comparative Examples (CE) 1-4 which were engraved with a laser image of a woman. Part II describes the preparation and testing of Example 5-10 and CE-1 engraved with a different laser and image. Part III describes the preparation and testing of Examples 11-18 and CE-1 engraved with a different laser. Part IV describes the preparation and testing of Ex. 11, 19 and 20 and CE-1 in a laminate construction engraved with a different laser and an image of a woman, Part V describes the preparation of Examples 21-24 by a coating process; the formation of a laminate engraved with the laser and image used in Part II.

Part I—Preparation of Microporous Sheet Materials of Examples 1-4 and CE 1-4

In the following Examples 1-4 and Comparative Examples (CE) 1-4, the formulations used to prepare the silica-containing microporous sheet materials of Part I are listed in Table 1. The dry ingredients were weighed into a FM-130D Littleford plough blade mixer with one high intensity chopper style mixing blade in the order and amounts [grams (g)]) specified in Table 1. The dry ingredients were premixed for 15 seconds using the plough blades only. The process oil was then pumped in via a double diaphragm pump through a spray nozzle at the top of the mixer, with only the plough blades running. The pumping time for the examples varied between 45-60 seconds. The high intensity chopper blade was turned on, along with the plough blades, and the mix was mixed for The mixtures of ingredients specified in Table 1 were extruded and calendered into sheet form using an extrusion system that included the following described feeding, extrusion and calendering systems. A gravimetric loss in weight feed system (K-tron model # K2MLT35D5) was used to feed each of the respective mixes into a 27 millimeter twin screw extruder (Leistritz Micro-27 mm) The extruder barrel was comprised of eight temperature zones and a heated adaptor to the sheet die. The extrusion mixture feed port was located just prior to the first temperature zone. An atmospheric vent was located in the third temperature zone. A vacuum vent was located in the seventh temperature zone.

Each mixture was fed into the extruder at a rate of 90 grams/minute. Additional processing oil also was injected at the first temperature zone, as required, to achieve a desired total oil content in the extruded sheet. The oil contained in the extruded sheet (extrudate) being discharged from the extruder is referenced herein as the extrudate oil weight fraction, which was based on the total weight of the sample. The arithmetic average of the extrudate oil weight fraction for all of the samples was 0.59. Extrudate from the barrel was discharged into a 38 centimeter wide sheet die having a 1.5 millimeter discharge opening. The extrusion melt temperature was 203-210° C.

The calendering process was accomplished using a three-roll vertical calender stack with one nip point and one cooling roll. Each of the rolls had a chrome surface. Roll dimensions were approximately 41 centimeters in length and 14 centimeters (cm) in diameter. The top roll temperature was maintained between 269° F. to 285° F. (132° C. to 141° C.). The middle roll temperature was maintained at a temperature from 279° F. to 280° F. (137° C. to 138° C.). The bottom roll was a cooling roll wherein the temperature was maintained between 50° F. to 70° F. (10° C. to 21° C.). The extrudate was calendered into sheet form and passed over the bottom water cooled roll and wound up. The sheet was approximately 10 mils thick. Thickness was determined using an Ono Sokki thickness gauge EG-225. Two 4.5×5 inch (11.43 cm×12.7 cm) specimens were cut from each sample and the thickness for each specimen was measured in twelve places (at least ¾ of an inch (1.91 cm) from any edge).

A sample of sheet cut to a width of approximately 18 cm and an approximate length of 150 cm was rolled up along with stainless steel wire mesh into a cylindrical shape, placed in a cylindrical canister and exposed to room temperature liquid 1,1,2-trichloroethylene for approximately 1 hour to extract oil from the sheet sample. The weight fraction of the remaining oil content of the samples was calculated based on the total weight of the sheet. The extracted sheet was air dried and subjected to the test methods described hereinafter. Results are tabulated in Table 2. On average, the samples became approximately 15 percent thinner following extraction.

Each of the sheet samples were laser engraved using a Nd/YVO$_4$ laser (DPSS Lasers, Inc-3500 Series; Santa Clara, Calif.) having a wavelength of 355 nm (nanometer), a pulse frequency of 30 kHz (kilo Hertz), a pulse length of 25 ns (nano second), and a pulse energy of 30 µJ (micro Joule). Each of the sheet samples were engraved with four facial images of a woman, each image being at a different resolution setting, i.e., 200, 300, 500 and 700 DPI (dots/inch). The marked images were evaluated visually on contrast and resolution of the image and ranked using a scale of 1, 2, or 3—with 1 being the worst (image indiscernible) and 3 being the best (image is readily discernable and relatively clear). If the image is discernible but the resolution is poor, e.g., image is fuzzy, the ranking given is a 2. If an image appeared better than other 2 ranked images but not as good as a 3 ranked image, a ranking of 2/3 was given. The same type of ranking (1/2) was applied when an image appeared better than other 1 ranked images but not as good as a 2 ranked image. A ranking of 3 was most desirable. Note that this ranking process was applied in each Part of the Examples and reflects the best and worst in each Part, but is not comparable between the different Parts of the Examples. For example, CE-1 was ranked 2 in Part 1 and 1 in Part II.

Physical properties measured on the extracted, dried and marked samples are listed in Table 2. The density (grams/cubic centimeters) of the samples was determined by dividing the average sample weight by the average sample volume of a specimen from each sample. The average weight of a sample was determined by weighing two 11 cm×13 cm specimens from each sample to two decimal places on an analytical balance and then dividing by 2. The average volume for the same specimens was determined by multiplying the length× the width×the thickness for each of the two specimens and then dividing by 2 to obtain an average sample volume. The average sample weight was then divided by the average sample volume to give the sample density (g/cc).

The Porosity reported in Table 2 was determined using a Gurley lensometer, model 4340, manufactured by GPI Gurley Precision Instruments of Troy, N.Y. The Porosity reported was a measure of the rate of air flow through a sample or it's resistance to air flow through the sample. The unit of measure is a "Gurley second" and represents the time in seconds to pass 100 cubic centimeters of air through a 1 inch (2.54 cm) square area using a pressure differential of 4.88 inches (1.2 kPa) of water. Lower values equate to less air flow resistance (more air is allowed to pass freely). The measurements were completed using the procedure listed in the manual, MODEL 4340 Automatic Densometer and Smoothness Tester Instruction Manual. TAPPI method T 460 om-06-Air Resistance of Paper can also be referenced for the basic principles of the measurement.

TABLE 2

| Property | Ex. 1 | Ex. 2 | Ex. 3 | CE-1 | CE-2 | Ex. 4 | CE-3 | CE-4 |
|---|---|---|---|---|---|---|---|---|
| Density, g/cc | 0.62 | 0.62 | 0.62 | 0.61 | 0.61 | 0.68 | 0.65 | 0.61 |
| Porosity, sec$^{(i)}$ | 1539 | 1466 | 1454 | 1534 | 1504 | 1344 | 1331 | 1505 |
| Resid. Oil, Wt % | 7.1 | 7.3 | 7.6 | 8.7 | 8.1 | 7.2 | 7.5 | 8.9 |
| Ranking | 3 | 3 | 2/3 | 2 | 2 | 3 | 2 | 1 |

$^{(i)}$Gurley Seconds

Part II—Preparation and Testing of Examples 5-10 and CE-1 with a Different Laser Examples 5-10 and CE-1 were prepared in the same manner as described in Part I except that each of the sheet samples were laser engraved using a Nd:YAG laser (Rofin-Sinar, model type: EasyMark, 10 watts maximum output) having a wavelength of 1064 nm (nanometer). The sheet samples were engraved with a grid pattern of small squares, representing a plot of power versus pulse frequency. The grid pattern was prepared with power ranging from 20 to 33 amps and frequency from 1,000 to 80,000 Hz. The marked patterns were evaluated visually on contrast and resolution of the pattern and ranked using a scale of 1, 2, or 3—with 1 being the worst (pattern indiscernible) and 3 being the best (pattern is readily discernable and relatively clear). If the pattern is discernible but the resolution is poor, e.g., portion of pattern is fuzzy, the ranking given is a 2. A ranking of 3 is most desirable. As mentioned in Part I, the ratings from each Part are not comparable. The specific formulation for each of Examples 5-10 and CE-1 is listed in Table 3 and the property of each sheet as well as a ranking of the engraved image is listed in Table 4.

TABLE 3

| Ingredients | Ex. 5 | Ex. 6 | Ex. 7 | Ex. 8 | Ex. 9 | Ex. 10 | CE-1 |
|---|---|---|---|---|---|---|---|
| Silica[a], grams | 2270 | 2270 | 2270 | 2270 | 2270 | 2270 | 2270 |
| CaCO$_3$[b], grams | 0 | 887 | 0 | 0 | 0 | 0 | 0 |
| TiO$_2$[c], grams | 273 | 273 | 273 | 273 | 273 | 273 | 91 |
| UHMWPE[d], grams | 631 | 839 | 631 | 631 | 631 | 631 | 631 |
| HDPE[e], grams | 631 | 774 | 631 | 631 | 631 | 631 | 631 |
| Antioxidant[f], grams | 16 | 16 | 16 | 16 | 16 | 16 | 16 |
| Lubricant[g], grams | 22.7 | 24 | 22.7 | 22.7 | 22.7 | 22.7 | 22.7 |
| Process oil[h], grams | 3815 | 4550 | 3815 | 3815 | 3815 | 3815 | 3815 |
| Blue Pellets[j], Grams | 0 | 60 | 0 | 0 | 0 | 0 | 0 |
| MICAB® A208[k], grams | 120 | 120 | 0 | 0 | 0 | 0 | 0 |
| PEAN 631210[l], grams | 0 | 0 | 40 | 80 | 0 | 0 | 0 |
| PEAN 631211[m], grams | 0 | 0 | 0 | 0 | 40 | 80 | 0 |

[j]Blue Pellet, ultramarine blue in polyolefin, obtained from Techmer PM.
[k]MICAB® A208, laser mark additive, obtained from EMD Chemicals Inc.
[l]PEAN 631210, laser mark additive, obtained from Clariant Corporation
[m]PEAN 631211, laser mark additive, obtained from Clariant Corporation

TABLE 4

| Property | Ex. 5 | Ex. 6 | Ex. 7 | Ex. 8 | Ex. 9 | Ex. 10 | CE-1 |
|---|---|---|---|---|---|---|---|
| Density, g/cc | 0.710 | 0.814 | 0.704 | 0.697 | 0.669 | 0.691 | 0.653 |
| Porosity, sec[i] | 2279 | 2339 | 2198 | 2257 | 2436 | 2106 | 2104 |
| Resid. Oil, Wt % | 10.9 | 7.6 | 11.3 | 9.0 | 11.1 | 8.6 | 9.3 |
| Ranking | 3 | 3 | 2 | 2 | 2 | 2 | 1 |

Part III—Preparation and Testing of Examples 11-18 and CE-1 with a Different Laser Examples 11-18 and CE-1 were prepared in the same manner as described in Part I except that each of the sheet samples were laser engraved using a Nd:YAG laser (Control Laser Corporation, model type: SCRIPT 75, 75 watts) having a wavelength of 1064 nm (nanometer). Each of the sheet samples were engraved with a grid pattern of small squares, representing a plot of power versus pulse frequency in the same manner as was done in Part II. The resulting grids were also ranked in the same manner. The specific formulation for each of Examples 11-18 and CE-1 is listed in Table 5 and the property of each sheet as well as a ranking of the engraved image is listed in Table 6.

TABLE 5

| Ingredients | Ex. 11 | Ex. 12 | Ex. 13 | Ex. 14 | Ex. 15 | Ex. 16 | Ex. 17 | CE-1 | Ex. 18 |
|---|---|---|---|---|---|---|---|---|---|
| Silica[a], grams | 2270 | 2270 | 2270 | 2270 | 2270 | 2270 | 2270 | 2270 | 2270 |
| TiO$_2$[c], grams | 273 | 400 | 273 | 273 | 0 | 0 | 130 | 91 | 0 |
| UHMWPE[d], grams | 631 | 631 | 631 | 631 | 631 | 631 | 631 | 631 | 631 |
| HDPE[e], grams | 631 | 631 | 436 | 436 | 290 | 290 | 290 | 631 | 484 |
| Antioxidant[f], grams | 16 | 16 | 16 | 16 | 16 | 16 | 16 | 16 | 16 |
| Lubricant[g], grams | 22.7 | 22.7 | 22.7 | 22.7 | 22.7 | 22.7 | 22.7 | 22.7 | 22.7 |
| Process oil[h], grams | 3815 | 3815 | 3815 | 3815 | 3815 | 3815 | 3815 | 3815 | 3815 |
| PolyOne® CC-10057869WE[n] | 0 | 0 | 195 | 0 | 195 | 0 | 0 | 0 | 0 |
| PolyOne® CC-10108220WE[o] | 0 | 0 | 0 | 195 | 0 | 195 | 195 | 0 | 0 |
| PolyOne® CC-101222070C[p] | 0 | 0 | 0 | 0 | 420* | 420* | 420* | 0 | 420* |

[n]PolyOne® CC10057869WE, laser mark additive, obtained from PolyOne Corporation.
[o]PolyOne® CC10108220WE, laser mark additive, obtained from PolyOne Corporation.
[p]PolyOne® CC101222070C, titanium dioxide, reported to be approximately 65 weight percent in polyolefin, obtained from PolyOne Corporation.
*Note that 420 grams of PolyOne® CC101222070C provides approximately 273 grams of titanium dioxide.

TABLE 6

| Property | Ex. 11 | Ex. 12 | Ex. 13 | Ex. 14 | Ex. 15 | Ex. 16 | Ex. 17 | CE-1 | Ex. 18 |
|---|---|---|---|---|---|---|---|---|---|
| Density, g/cc | 0.684 | 0.714 | 0.693 | 0.679 | 0.727 | 0.701 | 0.720 | 0.699 | 0.700 |
| Porosity, sec[i] | 3224 | 3580 | 2854 | 2237 | 2874 | 2327 | 2682 | 4631 | 2862 |
| Resid. Oil, Wt % | 8.9 | 9.1 | 9.9 | 6.4 | 7.2 | 8.8 | 7.2 | 10.2 | 7.3 |
| Ranking | 2 | 2 | 2 | 3 | 2 | 3 | 3 | 1 | 1/2 |

Part IV—Preparation and Testing of Examples 11, 19 and 20 and CE-1 in a Laminate Construction with a Different Laser Examples 11, 19 and 20 and CE-1 were prepared in the same manner as described in Part I except that each of the sheet samples were assembled into laminate constructions then laser engraved using a Nd:YAG laser (FOBA, model type:GS-20, 20 watts) having a wavelength of 1064 nm (nanometer). The laminates were prepared having an outer layer of Bayer DE1-1, reported to be a 10 mil clear polycarbonate film, supplied by Bayer Corporation and an inner layer of a film reported to be a 2 mil thick glycol-modified polyethylene terephthalate film supplied by Valeron Corporation in contact with the top and bottom of the sheets of Examples 11, 19 and 20 and CE-1. The resulting constructions having 2 top layers and 2 bottom layers on the sheet material of the Examples and CE were laminated at 290° F. (143.3° C.) at 1000 psi (70.3 kilogram-force/cm$^2$) for 15 minutes.

Each of the resultant laminate constructions was engraved on one side with a facial image of a woman. The marked images were evaluated visually on contrast, tonal quality and resolution of the image and ranked using a scale of 1, 2, or 3—with 1 being the worst (image indiscernible) and 3 being the best (image is readily discernable, good tonal quality and relatively clear). If the image was discernible but the tonal quality was less than that of the image ranked 3, the ranking given was a 2. A ranking of 3 is most desirable. The specific formulation for each of Examples 11, 19 and 20 and CE-1 is listed in Table 7, the laser setting used for each example are described in Table 8 and the property of each sheet as well as a ranking of the engraved image is listed in Table 9.

TABLE 7

| Ingredients | Ex. 11 | Ex. 19 | Ex. 20 | CE-1 |
|---|---|---|---|---|
| Silica[a], grams | 2270 | 2270 | 2270 | 2270 |
| TiO$_2$[c], grams | 273 | 273 | 130 | 91 |
| UHMWPE[d], grams | 631 | 631 | 631 | 631 |
| HDPE[e], grams | 631 | 631 | 290 | 631 |
| Antioxidant[f], grams | 16 | 16 | 16 | 16 |
| Lubricant[g], grams | 22.7 | 22.7 | 22.7 | 22.7 |
| Process oil[h], grams | 3815 | 3815 | 3815 | 3815 |
| MICAB ® A208[k], grams | 120 | 120 | 0 | 0 |
| Laser Flair ® 825[q] | | 40 | 40 | 0 |
| PolyOne ® CC-0057869WE[n] | 0 | 0 | 140 | 0 |
| PolyOne ® CC-0108220WE[o] | 0 | 0 | 60 | 0 |
| PolyOne ® CC-101222070C[p] | 0 | 0 | 420 | 0 |

[q]Laser Flair ® 825, laser mark additive, obtained from EMD Chemicals Inc.

TABLE 8

| | Laser Settings | | |
|---|---|---|---|
| Sample ID | Power, amps | Speed, mm/sec | Frequency, KHz |
| CE-1 | 20 | 800 | 12 |
| Ex. 11 | 17 | 800 | 12 |
| Ex. 19 | 16 | 800 | 9 |
| Ex. 20 | 16.25 | 800 | 12 |

TABLE 9

| Property | Ex. 11 | Ex. 19 | Ex. 20 | CE-1 |
|---|---|---|---|---|
| Density, g/cc | 0.710 | 0.700 | 0.722 | 0.689 |
| Porosity, sec$^a$ | 2279 | 1425 | 1355 | 1410 |
| Resid. Oil, Wt % | 10.9 | 10.0 | 11.24 | 10.1 |
| Ranking | 2 | 2 | 3 | 1 |

Part V—Preparation of Examples 21-24 by a Coating Process and Testing with the Laser of Part II Examples 21-24 were prepared by applying the coating formulations listed in Table 10 onto one side of TESLIN® SP microporous material (8.5 by 11 inches or 21.59 by 27.94 cm) having a thickness of 10 mil) placed on a glass surface and coated with a wire-wrapped rod (available from Gardco). The specific coating conditions are listed in Table 11. The coated sheets were dried at 110° C. for 3 minutes. Each of the sheet samples were prepared into a laminate construction with an outer layer of a nonporous film of polyester having an inner layer of a ethylene vinyl acetate hot melt adhesive (Transilwrap7/3KRTY) in contact with the top and bottom of the sheets of Examples 21-24. The resulting constructions having Transilwrap7/3KRTY/Ex. #/Transilwrap7/3KRTY were laminated at 325° F. (162.8° C.) with 2 passes through a twin roll laminator (Card/Guard Model 6100 from Jackson-Hirsch, Inc.).

The laminated samples were engraved with a grid pattern of small squares, representing a plot of power versus pulse frequency using a Nd:YAG laser (Rofin-Sinar, model type: EasyMark, 10 watts maximum output) having a wavelength of 1064 nm (nanometer). The grid pattern was prepared with power ranging from 20 to 33 amps and frequency from 1,000 to 80,000 Hz. The marked patterns were evaluated visually on contrast and resolution of the pattern and ranked using a scale of 1, 2, or 3—with 1 being the worst (pattern indiscernible) and 3 being the best (pattern is readily discernable and relatively clear). If the pattern is discernible but the resolution is poor, e.g., portion of pattern is fuzzy, the ranking was 2. A ranking of 3 was most desirable. An uncoated sheet of TESLIN® SP microporous material was used as the Control in Table 12 which lists the calculated amount of laser enhancing additive and the ranking.

TABLE 10

| Ingredients | Ex. 21 | Ex. 22 | Ex. 23 | Ex. 24 |
| --- | --- | --- | --- | --- |
| Witcobond ® W234[r], grams | 13.5 | 15.1 | 13.5 | 17 |
| Laser Flair ® 825[q], grams | 1 | 2.5 | 4 | 5 |
| Water, grams | 36 | 33 | 33 | 29 |
| Total Solids, % | 10 | 15 | 16 | 20 |

[r]Witcobond ® W234 is reported to be an aliphatic polyurethane dispersion produced by Witco Chemical.

TABLE 11

| Coating ID | Ex. 21 | Ex. 22 | Ex. 23 | Ex. 24 |
| --- | --- | --- | --- | --- |
| Rod # | 9 | 9 | 9 | 9 |
| Passes | 1 | 1 | 1 | 1 |
| Estimated wet Coat Weight, g | 1 | 1 | 1 | 1 |

TABLE 12

|  | Control | Ex. 21 | Ex. 22 | Ex. 23 | Ex. 24 |
| --- | --- | --- | --- | --- | --- |
| Calculated amount of Laser Enhancing Additive on surface, grams | 0 | 0.02 | 0.05 | 0.08 | 0.10 |
| Ranking | 1 | 2 | 2 | 2 | 3 |

Whereas particular embodiments of this invention have been described above for purposes of illustration, it will be evident to those skilled in the art that numerous variations of the details of the present invention may be made without departing from the invention as defined in the appended claims.

We claim:

1. A microporous material having improved laser marking capability, the microporous material comprising:
   (a) a polyolefin matrix;
   (b) finely divided, substantially water-insoluble filler distributed throughout the matrix, said filler comprising siliceous material and from 3 to 20 weight percent of titanium dioxide, based on the microporous material, said siliceous material being at least 50 weight percent of said filler;
   (c) a network of interconnecting pores communicating throughout the microporous material, the pores constituting 10 to 80 percent by volume of the microporous material;
   (d) 4 to 10 weight percent, based on the microporous material, of a particulate contrast enhancing material, other than titanium dioxide, that is distributed throughout the matrix;
   and wherein the particulate contrast enhancing material comprises reduced tungsten oxide, tin antimony oxide, tin antimony gray Cassiterite or mixtures thereof.

2. The microporous material of claim 1, wherein the polyolefin matrix material comprises a mixture of
   (a) 1 to 99 weight percent of substantially linear, ultrahigh molecular weight polyethylene; and
   (b) 99 to 1 weight percent of high density polyethylene.

3. The microporous material of claim 2, wherein the polyolefin matrix material further comprises a thermoplastic organic polymer different from polyethylene.

4. The microporous material of claim 3, wherein the thermoplastic organic polymer is selected from the group consisting of poly(tetrafluoroethylene), polypropylene polycarbonates, polyethylene terephthalate, glycol-modified polyethylene terephthalate, polyamides, polyurethanes, copolymers of ethylene and propylene, copolymers of ethylene and acrylic acid, copolymers of ethylene and methacrylic acid, and mixtures thereof.

5. The microporous material of claim 3, wherein the particulate contrasting enhancing material further comprises a thermoplastic organic polymer coated with antimony oxide and/or reduced tungsten oxide.

6. The microporous material of claim 1, wherein the filler further comprises non-siliceous materials different from the titanium dioxide.

7. The microporous material of claim 1, wherein the sum of the weight percent of the titanium dioxide comprising the microporous material and the weight percent of the contrast enhancing material comprising the microporous material is at least 7 weight percent based on total weight of the microporous material.

8. The microporous material of claim 1, wherein the titanium dioxide is present in an amount ranging from 3 to 15 weight percent.

9. A multilayer article comprising:
   (a) at least one layer of the microporous material of claim 1 in the form of a sheet; and
   (b) at least one transparent layer of polymeric material different from the polyolefin matrix material of the microporous material of layer (a) that is affixed to a surface of the sheet.

10. The multilayer article of claim 9, wherein the sum of the weight percent of the titanium dioxide comprising the microporous material and the weight percent of the contrast enhancing material comprising the microporous material is at least 7 weight percent based on total weight of the microporous material.

11. The multilayer article of claim 9, wherein the titanium dioxide is present in an amount ranging from 5 to 15 weight percent.

12. The multilayer article of claim 11, wherein the contrast enhancing material also is present as a component of the transparent layer of polymeric material affixed to a surface of the microporous material sheet.

13. The multilayer article of claim 9 wherein the article is a document selected from the group consisting of national identification cards, health insurance cards, institutional identification cards, entitlement cards, loyalty cards, driver's licenses, passports, membership cards, credit cards, banking cards, medical information cards, and security cards.

* * * * *